United States Patent
Kang et al.

(10) Patent No.: US 7,231,727 B2
(45) Date of Patent: Jun. 19, 2007

(54) APPARATUS AND METHOD FOR REMOVING MOISTURE

(75) Inventors: Dong-Chual Kang, Ulsan (KR); Dong-Hyun Kang, Suwon (KR); Sang-Bock Cho, Ulsan (KR)

(73) Assignee: ISGK Co., Ltd. (KR)

( * ) Notice: Subject to any disclaimer, the term of this patent is extended or adjusted under 35 U.S.C. 154(b) by 465 days.

(21) Appl. No.: 10/343,560

(22) PCT Filed: Apr. 23, 2002

(86) PCT No.: PCT/KR02/00748

§ 371 (c)(1),
(2), (4) Date: Jan. 31, 2003

(87) PCT Pub. No.: WO02/085679

PCT Pub. Date: Oct. 31, 2002

(65) Prior Publication Data

US 2003/0150129 A1  Aug. 14, 2003

(30) Foreign Application Priority Data

Apr. 25, 2001 (KR) .............................. 2001/22318
Mar. 28, 2002 (KR) .............................. 2002/17072

(51) Int. Cl.
*F26B 3/353* (2006.01)
*F26B 23/06* (2006.01)
*B60C 1/02* (2006.01)

(52) U.S. Cl. .................... 34/553; 34/531; 34/550; 219/203

(58) Field of Classification Search ............... 34/246, 34/528, 531, 550, 553; 219/202, 203
See application file for complete search history.

(56) References Cited

U.S. PATENT DOCUMENTS

| 3,649,898 A |   | 3/1972 | Inoue |
|---|---|---|---|
| 3,818,603 A | * | 6/1974 | Marcade ................... 34/532 |
| 3,832,527 A | * | 8/1974 | Nagasima .................. 219/522 |
| 3,902,040 A | * | 8/1975 | Ikeda et al. ................ 219/203 |
| 4,135,078 A | * | 1/1979 | Kuiff et al. ................ 219/203 |
| 4,196,338 A | * | 4/1980 | Edel .......................... 219/203 |

(Continued)

FOREIGN PATENT DOCUMENTS

DE        44 28 111       2/1996

(Continued)

*Primary Examiner*—Jiping Lu
(74) *Attorney, Agent, or Firm*—Fish & Richardson P.C.

(57) ABSTRACT

The present invention relates to a moisture removal apparatus and method for accurately detecting moisture generation in an early stage and quickly removing it so as to prevent steam or frost from being formed on glass surfaces of vehicles and industrial devices, and other surfaces. The apparatus comprises a surface resistance detector (50) including two detection terminals attached on an insulation surface with a predetermined gap therebetween, and showing different resistances according to an amount of moisture on the insulation surface; a static electricity preventer (60) preventing static electricity generation to the signal sensed by the surface resistance detector (50); a moisture sensor (70) determining moisture states through variations of the current that flows according to resistances of the surface resistance detector (50), and outputting a corresponding signal; and a driver (80) being operable to the signal output by the moisture sensor (70) and removing moisture generated on the surface.

9 Claims, 8 Drawing Sheets

U.S. PATENT DOCUMENTS

| | | |
|---|---|---|
| 4,705,998 A | 11/1987 | Millerd et al. |
| 4,805,070 A | 2/1989 | Koontz et al. .............. 361/286 |
| 4,942,349 A | 7/1990 | Millerd et al. |
| 5,771,140 A * | 6/1998 | Kim ........................... 361/111 |
| 6,084,417 A * | 7/2000 | Berberich ................... 324/711 |

FOREIGN PATENT DOCUMENTS

| | | |
|---|---|---|
| JP | 54-90731 | 7/1979 |
| KR | 1997-0040316 | 7/1997 |
| KR | 1997-0074392 | 12/1997 |
| KR | 1998-030803 | 8/1998 |

* cited by examiner

1. General glass material
2. Metal + Polyethylene
3. $H_2O$ Molecule

APPARATUS AND METHOD FOR REMOVING MOISTURE

BACKGROUND OF THE INVENTION (a) Field of the Invention

The present invention relates to an apparatus and method for removing moisture. More specifically, the present invention relates to a moisture removing apparatus and method for accurately and easily detecting moisture generation in an early stage and quickly removing it so as to prevent steam or frost from being created on glass surfaces of vehicles and industrial devices as well as other surfaces, and to prevent moisture such as rainwater from blocking a distance of vision.

(b) Description of the Related Art

As economies have developed and people have become more affluent, the number of cars has greatly increased, and they have now become necessities of life even though regarded as luxuries or exhibitions of wealth in the past.

However, as car distribution has increased, car accidents have also increased, and the people concerned and their families heavily suffer from death or damage caused by the car accidents, which generates social problems.

Accordingly, many efforts have been made to prevent car accidents, and techniques for preventing them and minimizing injuries and loss of life from car accidents have been developed.

Research for enhancing the distance of vision during driving has progressed in the field for preventing car accidents, including techniques for removing moisture caused by steam, frost, and rainwater.

In the rainy summer time or during very cold winter, the temperature difference between the interior and exterior of a car is large, the humidity inside the car increases which frequently generates steam on the windows, and this steam may obstruct a driver's view to thereby cause very dangerous driving situations.

When steam is generated on the windows, the driver conventionally controls the temperature in the car to reduce the humidity. In the winter, moisture in the air inside the car is condensed on the windows that are cooled because of the cold external temperature to become steam, the driver starts a heating system such as a heater and an electric heating apparatus such as heat wires to raise the temperature of the windows, thereby preventing the moisture in the interior air from being condensed.

In the above-described prior art, the driver undertakes a proper action after seeing the steam form on the windows. That is, the driver perceives that the steam begins to be formed on the windows, directly starts a heating apparatus, an electric heating apparatus, or a cooling system, and when a predetermined time has passed, the steam disappears. Therefore, since the driver's view is not clear for a long time, it problematically requires a long time to achieve a safe distance of view.

In order to prevent the generation of condensed moisture, such as steam and frost, chemicals may be applied to the windows. Namely, chemicals for preventing steam generation are coated on the windows or mirrors so that the steam may not be formed when the temperature and the humidity change. In this method, the chemicals may not be coated uniformly, they may partially peel off to cause a scattered reflection, and they may damage the windows as well as people.

To solve the problems and demerits, many types of apparatus for automatically sensing the generation of moisture on a surface and removing the moisture have been developed. FIG. 15 shows an exemplified apparatus.

As shown in FIG. 15, a prior art moisture remover comprises: a moisture sensor 10 for sensing generation of moisture on a window and outputting corresponding electrical signals; a microcomputer 20 for receiving the electrical signals from the moisture sensor 10, calculating them, and outputting a moisture removal signal when it is determined that the moisture is generated; and a driver 30 for removing steam formed on the window in response to the moisture removal signals output by the microcomputer 20.

The moisture sensor 10 comprises: a temperature sensor 11 for sensing the temperature inside a vehicle, and outputting corresponding electric signals; a humidity sensor 12 for sensing the humidity therein and outputting corresponding electric signals; and a CCD (charge coupled device) 13 for sensing the window and outputting corresponding electric signals.

The driver 30 comprises: an electric heating apparatus 31 for using power to generate heat and heating the windows in response to the moisture removal signal output by the microcomputer 20; and a cooling and heating apparatus 32 for supplying cold or hot air into the vehicle to control the temperature therein.

An operation of the prior art moisture remover will now be described.

When the temperature sensor 11 senses the temperature in the vehicle and outputs an electric signal, and the humidity sensor 12 senses the humidity therein and outputs an electric signal, the microcomputer 20 detects a time when steam is formed on the windows according to an input temperature value and an input humidity value, and it outputs a moisture removal signal when it is determined to be the time at which the steam is formed.

When the moisture removal signal is output by the microcomputer 20, the cooling and heating apparatus 32 or the electric heating apparatus 31 is individually operated to remove the moisture formed on the windows.

That is, as a heater or an air conditioner is driven as the cooling and heating apparatus 32, the temperature in the vehicle is cooled to prevent the moisture in the air inside the vehicle from being condensed in the summer, or the windows are heated to prevent the moisture in the air inside the vehicle from being condensed on the windows in the winter.

Also, by driving the electric heating apparatus 31, the moisture condensed on the windows is evaporated.

As described above, the prior art senses formation of steam or frost on the vehicle windows in the initial stage and removes it, thereby providing a clear view to the driver.

In addition, a CCD camera 13 may be installed in the vehicle to take desired images, and the corresponding images are analyzed by the microcomputer 20 to determine whether steam is formed to thereby output a moisture removal signal.

In the moisture remover, the temperature sensor 11 and the humidity sensor 12 are separately installed in the vehicle, values sensed by the temperature sensor 11 and the humidity sensor 12 are calculated by the microcomputer 20 to determine whether the steam is formed, but since the sensed values may vary depending on the locations of the temperature sensor 11 and the humidity sensor 12, corresponding reliabilities of these determining references are reduced.

The moisture remover additionally uses an expensive microcomputer 20 that executes much calculation, and accordingly, it problematically increases the cost of production.

Further, when steam instantly occurs in the CCD camera 13, the moisture remover fails to accurately determine moisture occurrence, and it requires a complex circuit and signal calculation for image processing, thereby increasing the cost of production.

Ultrasonic waves or infrared rays may be used to sense generation of moisture such as formation of steam or frost, which also requires a system for processing the ultrasonic waves and the infrared rays, and which requires complex calculation by the microcomputer using corresponding values, and hence, the whole system becomes complicated, the production cost becomes high, and it requires too much time to determine the generation of steam.

SUMMARY OF THE INVENTION

It is an object of the present invention to provide an apparatus and method for easily and accurately sensing moisture formation and removing the same so as to prevent moisture generation including steam or frost formation in vehicles or in industrial fields.

In one aspect of the present invention, an apparatus for removing moisture formed on a surface comprises: a surface resistance detector for detecting resistance of the surface, and outputting a corresponding signal; a moisture sensor for determining moisture generation states through variation of a current that flows according to the resistance of the surface resistance detector, and outputting a moisture sensing signal; and a driver for being operable according to the moisture sensing signal output by the moisture sensor to remove moisture generated on the surface.

If the target surface to be sensed is an insulator, the surface resistance detector comprises: a first terminal of conductive material, being attached on the surface, and being coupled to the moisture sensor; and a second terminal of conductive material, being attached on the surface at a predetermined distance from the first terminal, and receiving power.

The surface resistance detector further comprises a ground substrate, attached on the bottom of the target surface to be sensed, for preventing generation of electromagnetic interference or static electricity on the target surface.

If the target surface to be sensed is conductive, the surface resistance detector comprises: an insulation substrate with a high hydrophilic property, being attached on the surface; a first terminal of conductive material, being attached on the insulation substrate, and being coupled to the moisture sensor; and a second terminal of conductive material, being attached on the insulation substrate at a predetermined distance from the first terminal, and receiving power.

The surface resistance detector further comprises a ground substrate formed between the insulation substrate, the first terminal, and the second terminal.

The surface resistance detector uses heat wires provided on glass window surfaces of a vehicle.

In another aspect of the present invention, an apparatus for removing moisture generated on a surface comprises: a surface resistance detector for detecting resistance of the surface, and outputting a corresponding signal; a moisture sensor for determining moisture generation states through variations of the current that flows according to resistance of the surface resistance detector, and outputting a corresponding moisture sensing signal; a controller for receiving the moisture sensing signal from the moisture sensor, and controlling to remove moisture generated on the surface; and a driver being operable according to a control signal output by the controller, for removing the moisture generated on the surface.

The moisture sensor comprises: a reference current generator for generating a reference current for determining moisture sensing states, and outputting the reference current; a current detector for determining moisture states through variations of the current that flows according to resistance of the surface resistance detector, and outputting a corresponding signal; a detection signal output unit for outputting corresponding logical value signals according to detected values output by the current detector; a signal smoother for converting the logical value signals output by the detection signal output unit into smoothed digital signals, and outputting the digital signals; and a current source supply for supplying current used for an operation of the current detector and the detection signal output unit.

The moisture sensor comprises: a voltage source for generating a predetermined voltage; a reference resistor for using the voltage of the voltage source, generating a reference current used for determining moisture sensing states, and outputting the reference current; and an operational amplifier for receiving variations of the current that flows according to the resistance of the surface resistance detector, comparing them with the reference current input through the reference resistor, determining moisture states, and outputting a corresponding signal.

The moisture sensor comprises: a first resistor for receiving driving power, and supplying power used for an operation of the surface resistance detector; a second resistor for converting the signal output by the surface resistance detector into a voltage signal, and outputting the voltage signal; and an operational amplifier for receiving a signal (input through the second resistor) of the surface resistance detector through a non-inverting terminal, smoothing the signal, and outputting the smoothed signal to the driver.

The controller comprises: an analog-digital converter for converting the current sensed by the moisture sensor into a digital signal, and outputting it; a microcomputer for receiving the moisture sensing signal output by the moisture sensor, determining moisture generation states, generating a corresponding moisture removal control signal, outputting the same to the driver, receiving the digital signal output by the analog-digital converter, and providing information on generation and amount of moisture to a user; and a display for displaying the signals output by the microcomputer to the user.

In still another aspect of the present invention, a method for to removing moisture by using a signal output by a moisture sensor for sensing moisture generation states through variations of the current that flows according to resistance of a surface comprises: (a) reading a moisture sensing signal output by the moisture sensor for a predetermined time frame to determine whether the moisture generation is instantaneous or continuous; (b) controlling to remove the generated moisture when the moisture is continuously generated in (a); (c) reading the moisture sensing signal output by the moisture sensor for a predetermined time after the control of (b) to determine whether the moisture is completely removed; and (d) terminating moisture removal control when it is determined in (c) that the moisture is completely removed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
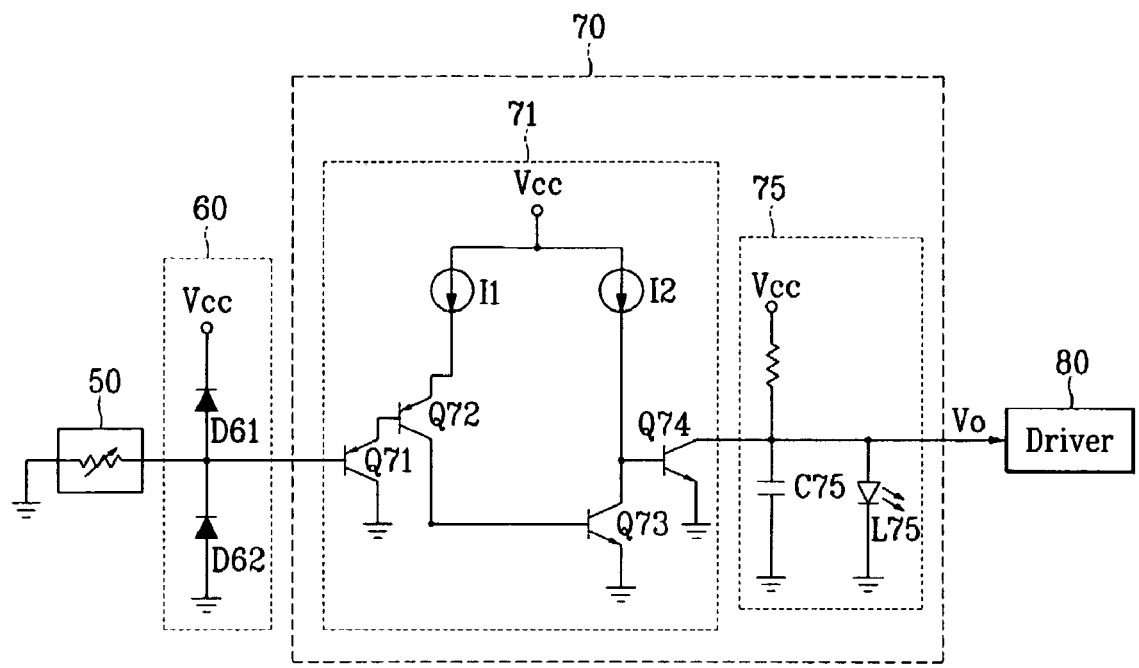
FIG. 1 shows a moisture remover according to a first preferred embodiment of the present invention.

FIG. 1 shows a moisture remover according to a first preferred embodiment of the present invention.

As shown, the moisture remover comprises: a surface resistance detector 50; a static electricity preventer 60; a moisture sensor 70; and a driver 80.

The surface resistance detector 50 comprises two metallic terminals attached on a window surface with a predetermined gap therebetween, and it detects resistance that follows moisture formation such as steam or frost generation. The static electricity preventer 60 prevents generation of static electricity that can affect signals sensed by the surface resistance detector 50.

The moisture sensor 70 determines moisture states through a variation of the current that flows according to the resistance of the surface resistance detector 50, and outputs a corresponding signal. The driver 80 removes the moisture formed on the glass surface in response to the signal output by the moisture sensor 70.

The moisture sensor 70 comprises a current detector 71 for detecting the variation of the current that flows to the surface resistance detector 50, and for outputting a corresponding detection signal; and a signal smoother 75 for converting a value of the detection signal output by the current detector 71 into a smoothed driving signal, and outputting it.

In this instance, the current detector 71 comprises pnp transistors Q71 and Q72, and npn transistors Q73 and Q74. The base of the transistor Q71 is coupled to a metallic film of the surface resistance detector 50 or one of detection terminals of conductive tape, and the collector of the transistor Q71 is grounded. The base of the transistor Q72 is coupled to the emitter of the transistor Q71, and the collector of the transistor Q72 is coupled to the base of the transistor Q73. The emitters of the transistors Q73 and Q74 are grounded, and the collector of the transistor Q73 is coupled to the base of the transistor Q74. Driving power Vcc is supplied to the emitter of the transistor Q72 and the collector of the transistor Q73, and the collector of the transistor Q74 is coupled to the signal smoother 75.

The signal smoother 75 comprises a resistor R75, a capacitor C75, and a light emitting diode (LED) L75. The resistor R75 is coupled to the capacitor C75 in series between the driving power Vcc and the ground, and the coupling point of the resistor R75 and the capacitor C75 is coupled to an output terminal of the current detector 71 and the driver 80. The LED L75 is coupled between the coupling point and the ground.

The static electricity preventer 60 comprises diodes D61 and D62 coupled in series between the driving power Vcc and the ground in the counter direction, and the coupling points of the diodes D61 and D62 are coupled to the surface resistance detector 50.

Figure 2:
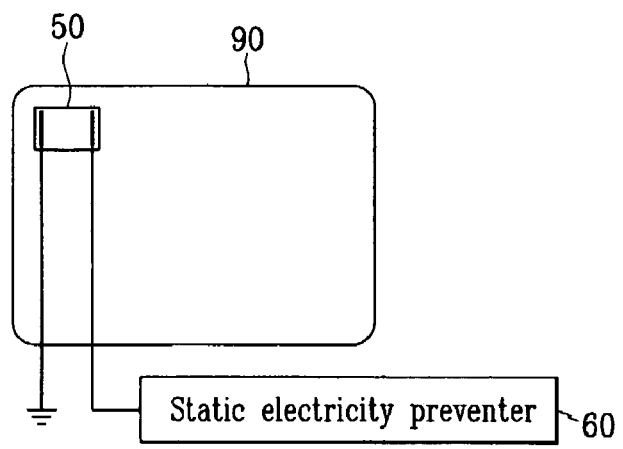
FIG. 2 shows an exemplified installation of the moisture remover according to a first preferred embodiment of the present invention.
Figure 3:
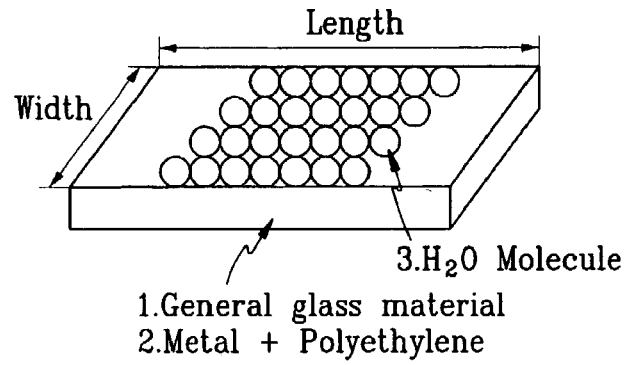
FIG. 3 shows a steam formation phenomenon.

Referring to FIGS. 1 through 3, an operation of the moisture remover according to the first preferred embodiment of the present invention will be described.

FIG. 2 shows an exemplified installation of the moisture remover according to the first preferred embodiment of the present invention, and FIG. 3 shows a steam formation phenomenon.

As shown in FIG. 2, a metallic film of the surface resistance detector 50 coated in metal or a detection terminal of conductive tape is attached on a portion of the window 90 where steam is formed.

When moisture is formed (e.g., steam is formed on the window glass 90) while one of the detection terminals is coupled to the static electricity preventer 60, and the other of the detection terminals is grounded, the resistance between the detection terminals is reduced such that the current flows between the detection terminals.

The steam is provided on the window glass because the moisture in the air in the vehicle reaches the dew point and the moisture is formed as droplets of water on the cold window glass, which reduces the resistance.

In this instance, if polyethylene for preventing static electricity is used as the detection terminals, it is very effective for detecting the current. That is, general polyethylene is not conductive, but polyethylene for preventing static electricity is processed with a small quantity of metallic film and it accordingly has weak conductivity with a high resistance of several tens of giga-ohms. When the moisture occurs because of steam or frost, the resistance changes.

Namely, the polyethylene for preventing static electricity has a high intrinsic resistance and it flows no current under normal conditions, but when in the steam is generated, the resistance is reduced such that a minute current may flow because of the moisture.

In general, since the window glass is coated with a predetermined film, the resistance changes slightly when the steam is formed on it, differing from ordinary glass plates, and accordingly, the metal-coated polyethylene for preventing static electricity may be used for the detection terminals in the surface resistance detector 50. The polyethylene for preventing static electricity is very thin as vinyl and is easily adhered to the glass, it is semitransparent so as not to obstruct the driver's view, and it maintains the temperature of the contact surface to instantly form the steam on the window glass when the moisture is formed on the window glass, so it has a fast response speed.

FIG. 3 shows a glass surface with moisture thereon in the form of steam or frost. In the case of general glass material, $H_2O$ molecules are condensed on the surface of the window glass to reduce the resistance that is proportional to its length.

However, in the case of an insulator that has undergone surface processing and has limitless surface resistance as does window glass, a high resistive material such as metal-coated polyethylene is attached to it, as shown in FIG. 3, to thereby reduce the resistance and allow detection of the current that passes as a result of the moisture.

As to its operation, with reference to FIG. 1, when steam or frost is formed, or rain or snow falls to generate moisture, the resistance between the detection terminals of the surface resistance detector 50 is reduced to allow the flow of current, and when the current reaches the bias current of the transistor Q71 of the current detector 71, the transistor Q71 is turned on, and the transistor Q72 is then turned on.

When the transistor Q72 is turned on, the current flows to the base of the transistor Q72 to turn on the transistor Q73, and accordingly, no current flows to the base of the transistor Q74.

Hence, the transistor Q74 is turned off, and the steam formation determining signal Vo output to the driver 80 becomes a high driving signal to drive the driver 80.

The driver 80 includes electric heating devices such as window heat wires installed in conventional vehicles, and cooling and heating systems such as heaters and air conditioners.

In the normal condition when no steam is formed, since the resistance between the two detection terminals of the surface resistance detector 50 allows no current to flow, the transistor Q71 of the current detector 71 is turned off, and the transistor Q72 is accordingly maintained in an off state.

Since the transistor Q73 is also turned off to supply the driving power Vcc to the base of the transistor Q74, the transistor Q74 is turned on to output a low steam formation determining signal, and the driver 80 is not driven.

The static electricity preventer 60 controls such that a signal from static electricity may not be input to the signal input of the moisture sensor 70. The signal smoother 75 of the moisture sensor 70 converts the signal output by the current detector 71 into a smoothed signal for driving the driver 80, and outputs the same.

Therefore, when no steam occurs, the transistor Q74 is not turned on and the driver 80 is not driven, but when the steam is formed on the window glass, the resistance between the two detection terminals of the surface resistance detector 50 changes, the transistors Q71, Q72, and Q73 are turned on to turn off the transistor Q74, and accordingly, the driving power Vcc is supplied to the driver 80 to prevent steam formation.

In the first preferred embodiment of the present invention, pnp transistors are used for the transistors Q71 and Q72, and npn transistors for the transistors Q73 and Q74, and other types of transistors may also be used without being limited to these.

The sensors of the surface resistance detector 50, in order to detect moisture, are required to not absorb moisture, to show temperatures (e.g., a surface temperature) to be detected under a sudden temperature change condition, and to not become warm.

In the first preferred embodiment of the present invention, metal-coated polyethylene for preventing static electricity is applied, and the polyethylene has a resistance of between 1 and 999 giga-ohms in the normal condition. Further, other high resistance materials may be used instead of the polyethylene.

Figure 9:
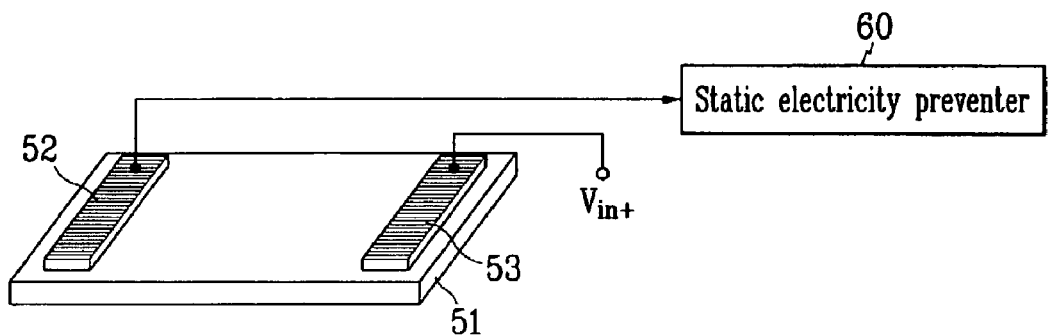
FIG. 9 shows a surface resistance detector when a sensing target surface is an insulator in FIG. 1.
Figure 10:
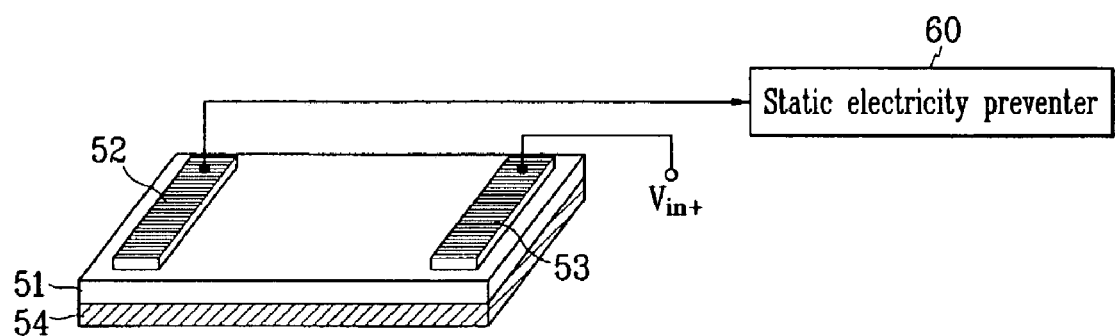
FIG. 10 shows a surface resistance detector for preventing electromagnetic interference (EMI) and electrostatic phenomena in FIG. 1.
Figure 11:
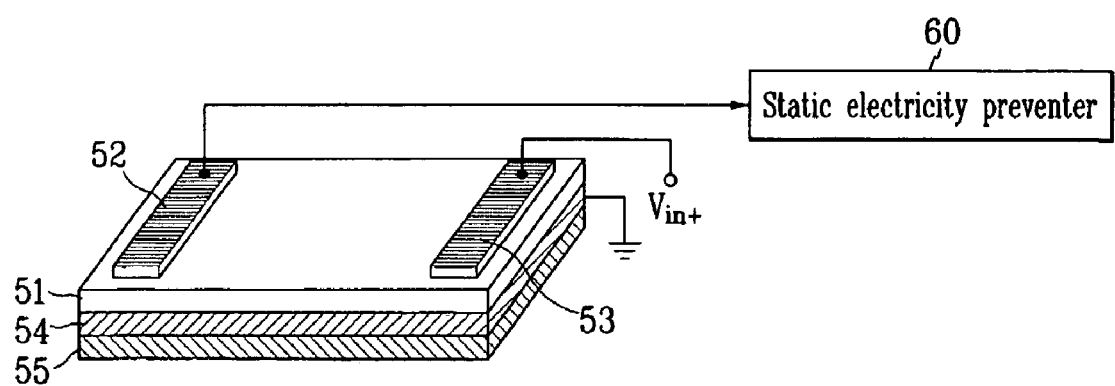
FIG. 11 shows a surface resistance detector when a sensing target surface is a conductor in FIG. 1.

Methods for installing the surface resistance detector 50 are varied according to states of a sensing target surface as shown in FIGS. 9 through 11.

When the sensing target surface is an insulator, as shown in FIG. 9, a conductive metallic film or a terminal 52 of conductive tape is attached to a sensing surface 51 of the insulator to be coupled to the static electricity preventer 60, and a terminal 53 is attached at a predetermined distance from the terminal 52 to supply power Vin+.

In order to prevent generation of electromagnetic interference (EMI) or static electricity on the sensing target surface, a ground substrate 54 is additionally provided under the sensing surface 51, as shown in FIG. 10.

To remove steam formation from the conductive surface and not from the window glass or general glass, it is required to insert an insulator between the metallic film or the conductive tape and the conductive surface such that the metallic film or the conductive tape is not directly adhered to the corresponding conductive surface.

If the insulator is not inserted therebetween, the current continues to flow when the steam is either formed or not according to the conductive surface, thereby failing to perform accurate sensing.

That is, when the sensing target surface is conductive, as shown in FIG. 11, an insulated sensing surface 51 is set, terminals 52 and 53 are attached on it, a ground substrate 54 is attached under the sensing surface, and an insulation substrate 55 is additionally attached under that so all of them are attached to the target surface.

In this instance, when a material with a hydrophilic property is used for the sensing surface 51, its detecting sensitivity may be enhanced.

That is, in the case of a material that has a contact angle of almost 0 degrees which is generated when the moisture touches the material, the material has excellent wetness and detection performance, and it is more suitable if the material has a contact angle of within 0 to 90 degrees, and when a material with an ultra-hydrophilic property having a contact angle of from 0 to 15 degrees is used, better performance is achieved.

Referring to FIG. 11, when the static electricity or EMI is not great, the ground substrate 54 may be omitted, which is not illustrated.

In the case of applying the two terminals of the surface resistance detector 50, components in the conventional vehicle may be used without additional components.

Namely, in the case of conventional vehicles, heat wires are provided on the rear window to remove steam or to melt snow to obtain a clear view, and two of the heat wires may be used as two terminals to realize the surface resistance detector 50.

In particular, when heat wires for removing the frozen snow on the windshield are provided around wipers in the case of expensive vehicles, if the corresponding heat wires are used as two terminals of the surface resistance detector 50, better performance may be obtained without additional devices.

In the first preferred embodiment of the present invention, removal of moisture according to formation of steam on the windows is described, and the present invention may further be applied to various industrial fields that have safety problems as a result of formation of moisture and that require removal and prevention of moisture where it may form.

Also, in the first preferred embodiment of the present invention, since the windows are insulators, formation of steam is detected using a metallic film or a conductive tape, and in the case of general glass substrates used for general industrial fields, the glass surfaces are used as sensors without using additional detection terminals for preventing static electricity.

That is, when a detection electrode is directly attached on the glass substrate, and another electrode is grounded on a portion at a predetermined distance from the detection electrode, no current flows because of intrinsic resistance of the glass. When steam is formed, the resistance is reduced because of the moisture, and the current flows so the formation of steam may be detected, and hence the surface may function as a sensor.

In addition, other materials of high resistance may also be used for the glass surface.

Figure 12:
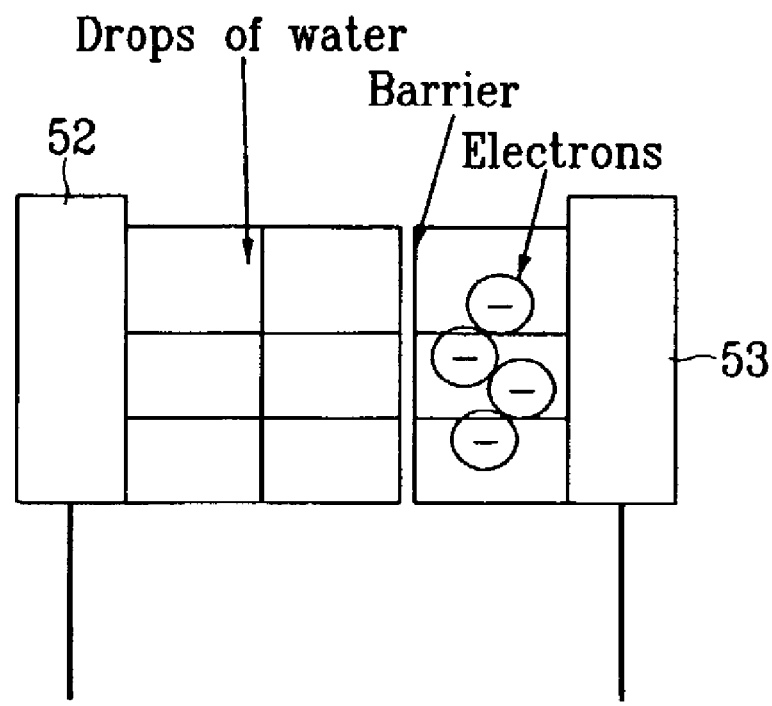
FIG. 12 shows formation of steam generated between each terminal.
Figure 13:
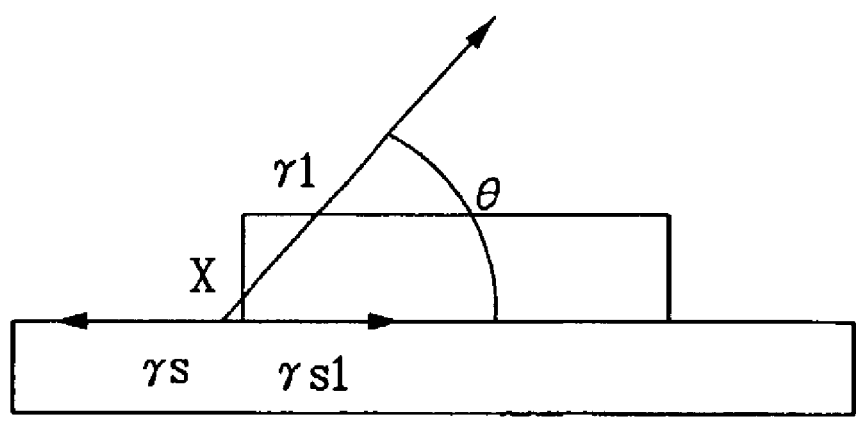
FIG. 13 shows surface tension and a contact angle.
Figure 14:
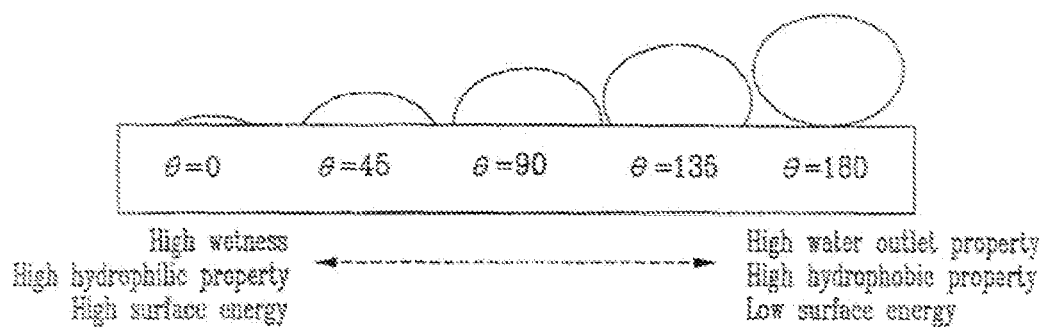
FIG. 14 shows contact angles of droplets of water.
Figure 15:
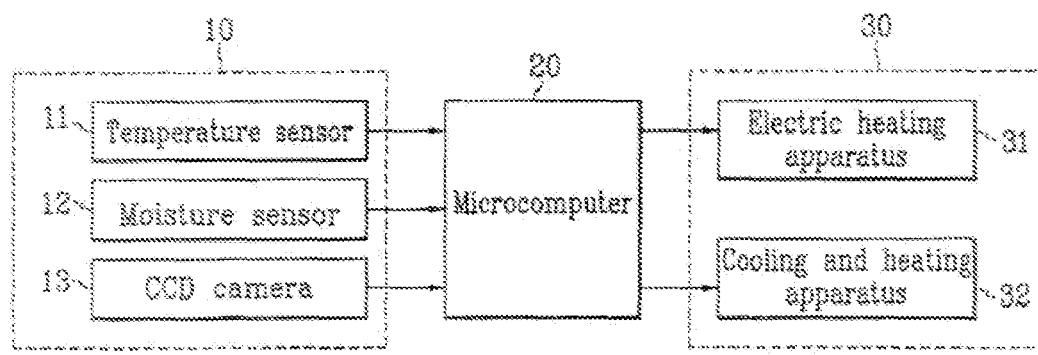
FIG. 15 shows a prior art moisture remover.

FIGS. 12 through 14 show a method for sensing moisture on a surface, and referring to them, a condition of the surface resistance detector 50 for sensing moisture will be described.

As shown in FIG. 12, when moisture is formed on an insulated surface, minute droplets of water are formed, and a barrier level (i.e., resistance) of electron flow is determined according to patterns of the droplets of water.

That is, the barrier level of the electron flow is determined depending on the surface tension of the insulator and the condensed droplets of water, and in this instance, detecting performance is determined with respect to the contact angle that represents patterns of droplets of water.

In other words, in the case conductive liquid droplets such as steam are formed, electrons fluidly flow to the terminals when the droplets are connected.

When a liquid droplet falls on a surface of a solid material, a force applied to a predetermined point X is determined by a surface tension $\gamma s$ of a solid material, a surface tension $\gamma_1$ of a liquid material, and an interfacial tension $\gamma s_1$ between a liquid material and a solid material, and their relationship is expressed in Equation 1.

$$\gamma s = \cos \theta + \gamma s_1 \qquad \text{Equation 1}$$

where the angle $\theta$ represents the contact angle for indicating wetness of the surface of a solid material. FIG. 13 shows a relationship between the surface tension and the contact angle.

The contact angle shows an angle generated when liquid is thermodynamically equivalent on the surface of solid material, and it is determined by adhered droplets of water. A low contact angle indicates a high wetness (i.e., a hydrophilic property) and a high surface energy, and a high contact angle represents a low wetness (i.e., a hydrophobic property) and a low surface energy. FIG. 14 shows the representative patterns of droplets of water for various contact angles.

In general, the surface tension of water varies according to temperature, from 60 to 76 dyne/cm, it is greatest next to mercury (Hg), and it forms a drop pattern for minimizing a surface area.

As the contact angle becomes greater, the gaps between the droplets of water function as resistance material that interferes with current flow, and hence it is difficult to initially detect moisture, and as the contact angle becomes lower, it is easier to detect moisture. It is desirable for the contact angles to have values of less than 90 degrees regarding its wetness environment so that detection performance may be adequate.

Further, in the case the sensing target surface has a water outlet effect, that is, in the case the contact angle is greater than 90 degrees, which interferes with electron flow, if a new surface tension $\gamma'_1$ of a liquid and an interfacial tension $\gamma s'_1$ between a liquid and a solid are lowered by adding a surfactant, the contact angle may be reduced as expressed in Equation 2.

$$\gamma s > \gamma'_1 \cos \theta + \gamma s'_1 \qquad \text{Equation 2}$$

In this case, since the surface tension n is greater than the sum of the surface tension $\gamma'_1$ of the liquid and the interfacial tension $\gamma s'_1$ between the liquid and the solid, the droplets of water spread at the point X in the direction of the surface tension $\gamma s$ of the solid to thereby reduce the contact angle.

Therefore, in order to enhance detecting performance of the surface resistance detector 50, a surfactant is provided on the sensing surface, the sensing surface is coated with a material with a high hydrophilic property or the terminals are formed on a substance with a high hydrophilic property.

Figure 4:
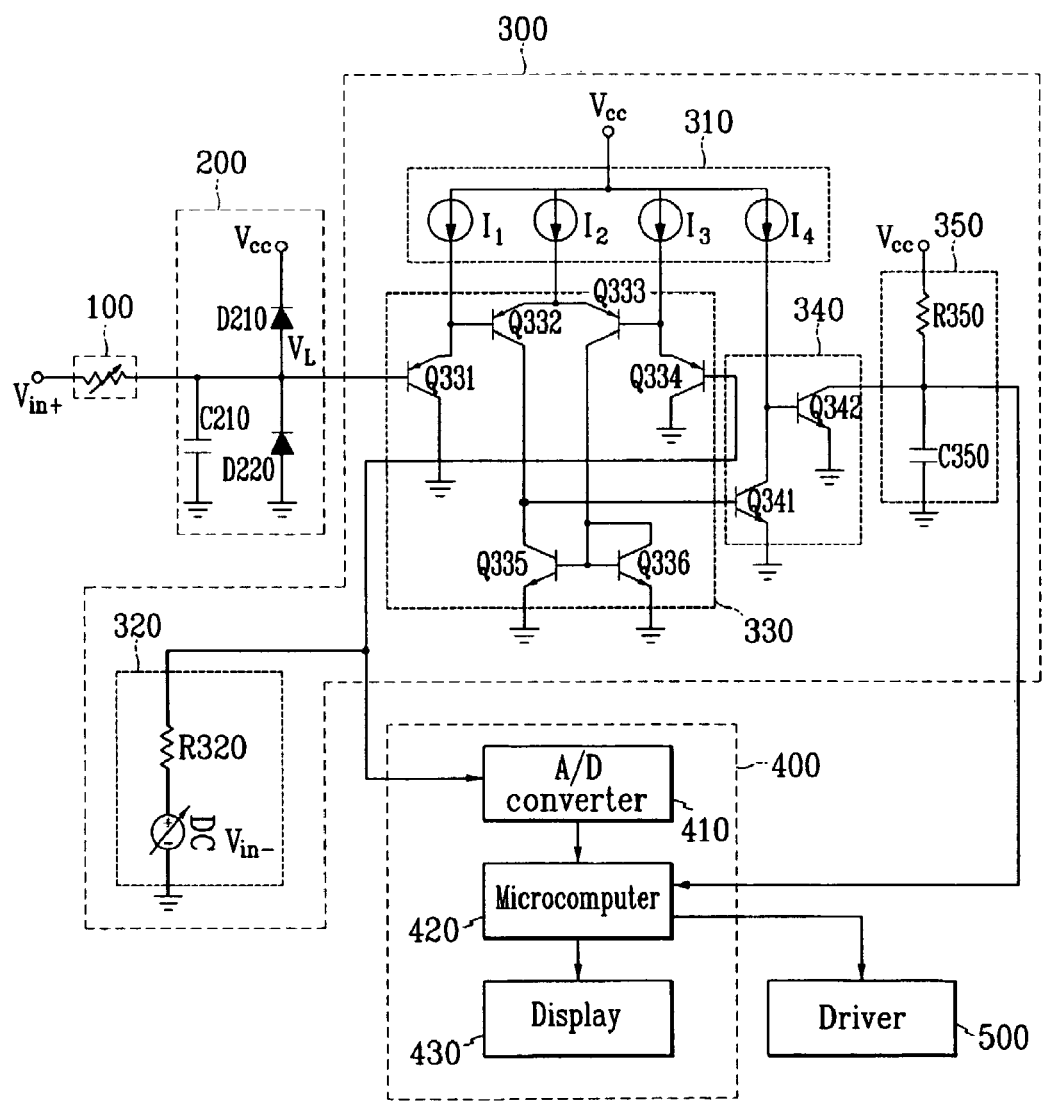
FIG. 4 shows a moisture remover according to a second preferred embodiment of the present invention.

FIG. 4 shows a moisture remover with increased precision of moisture detection and enhanced smoothness compared to the first preferred embodiment of the present invention.

With reference to drawings, the moisture remover according to a second preferred embodiment of the present invention will now be described.

As shown in FIG. 4, the moisture remover comprises a surface resistance detector 100, a static electricity preventer 200, a moisture sensor 300, a controller 400, and a driver 500.

The surface resistance detector 100 may be realized in various ways as described in the first preferred embodiment of the present invention, and no repeated description will be provided.

The static electricity preventer 200 comprises diodes D210 and D220 and a capacitor S210, and it prevents static electricity generation to the signals sensed by the surface resistance detector 100.

The moisture sensor 300 comprises a current source supply 310, a reference current generator 320, a current detector 330, a detection signal output unit 340, and a signal smoother 350, and it determines moisture states through variations of the current that flows according to the resistance of the surface resistance detector 100, and outputs corresponding signals.

The current source supply 310 comprises current sources I1, I2, I3, and I4, and it supplies the current required for operating the current detector 330 and the detection signal output unit 340.

The reference current generator 320 comprises a voltage source Vin- and a resistor R320, and it supplies the reference current used for determining whether moisture is sensed.

The current detector 330 comprises pnp transistors Q331, Q332, Q333, and Q334, and npn transistors Q335 and Q336, and it detects variations of the current that flows to the surface resistance detector 100, compares them with the voltage generated by the reference current generator 320, and outputs corresponding detection signals to the detection signal output unit 340.

In this instance, the base of the transistor Q331 is coupled to a detection terminal of the surface resistance detector 100, the collector of the transistor Q331 is grounded, and the current source 11 of the current source supply 310 is supplied to the emitter of the transistor Q331. The base of the transistor Q332 is coupled to the emitter of the transistor Q331, the collector of the transistor S332 is coupled to the detection signal output unit 340, and the current source 12 of the current source supply 310 is supplied to the emitter of the transistor Q332.

The base of the transistor Q333 is coupled to the emitter of the transistor Q334, and the current source 12 of the current source supply 310 is supplied to the emitter of the transistor Q333. The collector of the transistor Q334 is grounded, and the current source 13 and the output signal of the reference current generator 320 are respectively supplied to the emitter and the base of the transistor Q334. The collector of the transistor Q335 is coupled to the collector of the transistor Q332, the base of the transistor Q335 is coupled to the collector of the transistor Q333, and the emitter of the transistor Q335 is grounded. The collector and the base of the transistor Q336 are coupled, and the emitter of the transistor Q336 is grounded.

The detection signal output unit 340 comprises: a transistor Q341 having a base receiving output signals of the current detector 330, a collector receiving the current source 14 of the current source supply 310, and a is grounded emitter; and a transistor Q342 having a base coupled to the collector of the transistor Q341, and a grounded emitter, and it outputs corresponding signals according to detected values output by the current detector 330. The transistors Q341 and Q342 include npn transistors.

The signal smoother 350 comprises a resistor R350 and a capacitor C350 coupled in series between the driving power Vcc and the ground, and the coupling point of the resistor R350 and the capacitor C350 is coupled to an output terminal of the detection signal output unit 340. The signal smoother 350 converts values of detection signals output by the detection signal output unit 340 into driving signals, and outputs them.

The controller 400 comprises an analog-digital (A/D) converter 410, a microcomputer 420, and a display 430, and the controller 400 receives signals from the moisture sensor 300, controls to remove moisture, and notifies a user of moisture generation.

An operation of the moisture remover according to the second preferred embodiment of the present invention will be described below.

When moisture including steam is generated, resistance between two terminals of the surface resistance detector 100 is reduced to flow the current, the current is supplied to the base of the transistor Q331, and when this current is greater than the current supplied to the transistor Q334 through the resistor R320 of the reference current generator 320, the transistors Q332 and Q335 are turned on.

Accordingly, the transistor Q341 of the detection signal output unit 340 is turned on, the transistor Q342 is turned off, and the value of the driving power Vcc supplied to the signal smoother 350 is output to the controller 400 through the resistor R350 to thereby notify, using a logical high value, that moisture is generated on the sensing surface.

However, when no moisture is generated or when the current flowing between the two terminals of the surface resistance detector 100 is less than the current supplied to the transistor Q334 through the resistor R320 of the reference current generator 320, the transistor Q332 is turned off, the transistor Q335 is then tuned off, and the transistors Q333 and Q334 are turned on.

Accordingly, the transistor Q341 of the detection signal output unit 340 is turned off, the transistor Q342 is turned on, the driving power Vcc is supplied to the signal smoother 350 through the eighth transistor Q342, and a logical low value is provided to the controller 400 to thereby notify that no moisture is generated on the sensing surface.

The controller 400 drives the driver 500 or stops the same according to values of the signal output by the moisture sensor 300 thereby controlling to remove the moisture.

Figure 8:
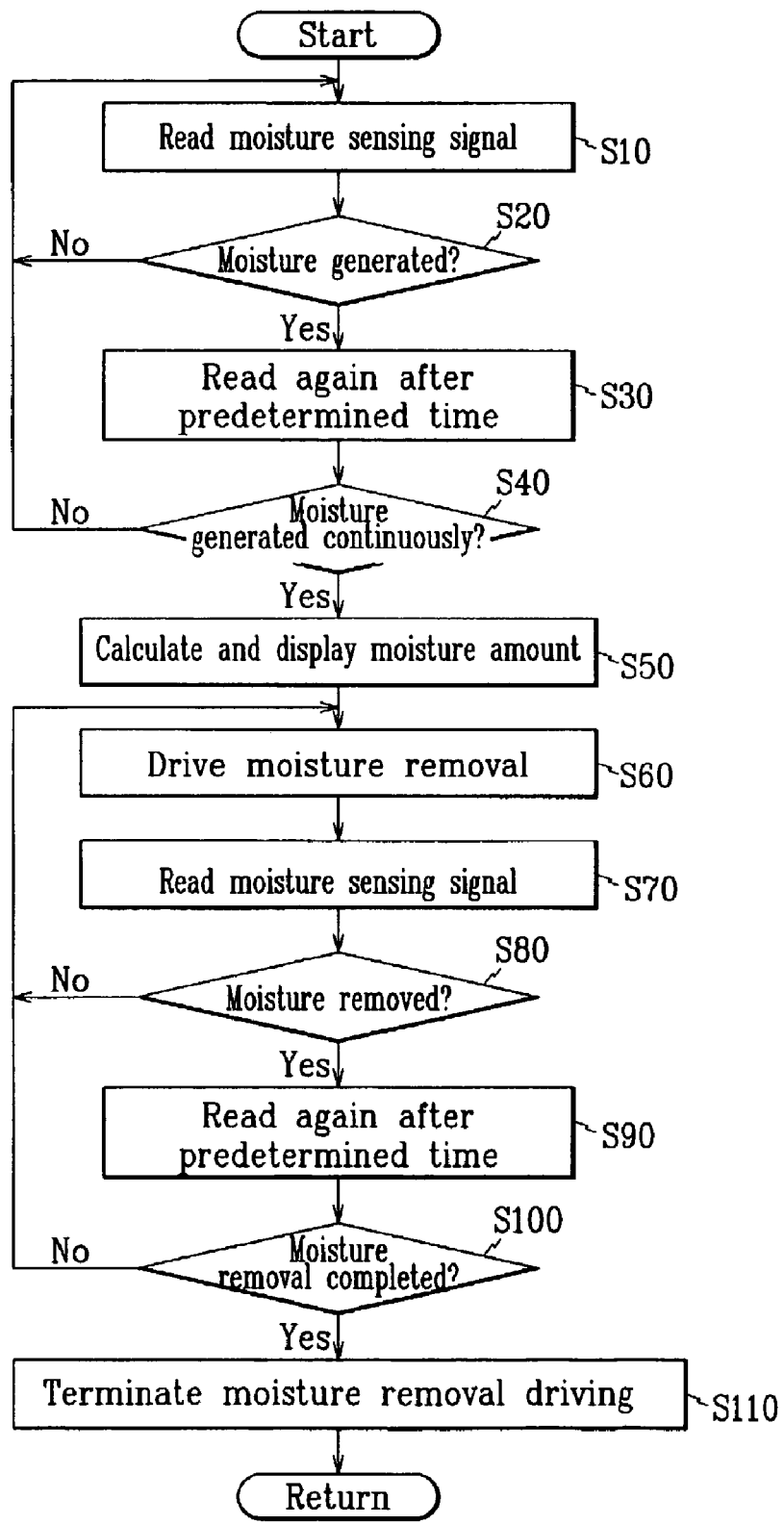
FIG. 8 shows a flowchart for a moisture removal method according to the preferred embodiment of the present invention.

Referring to FIG. 8, an operation of the controller 400 will be described in detail.

The microcomputer 420 of the controller 400 reads a moisture sensing signal output by the moisture sensor 300 in step S10 to determine whether moisture is formed in step S20.

When it is determined that moisture is formed, the microcomputer 420 allows a predetermined time frame to be passed, and reads a moisture sensing signal again in step S30 to determine whether moisture generation is maintained in step S40.

When it is determined that the moisture generation is maintained after the predetermined time frame, the microcomputer 420 controls the driver 500 to remove moisture in step S60.

The microcomputer 420 then reads a moisture sensing signal again in step S70 to determine whether the moisture is removed in step S80.

When it is determined that the moisture is removed, the microcomputer 420 allows a predetermined time frame to be passed, and reads a signal output by the moisture sensor 300 again to determine whether the moisture removal is finished temporarily or completely in step S100.

When it is determined that the moisture is completely removed, the microcomputer 420 controls the driver 500 to terminate moisture removal driving in step S110.

As controlled above, an operation of moisture sensing or moisture removal is accurately controlled when an instantaneous error is generated.

When it is found that moisture is generated in the previous step S40, the microcomputer 420 controls the A/D converter 410 to convert the current detected by the moisture sensor 300 into digital values, displays the digital values on the display 430 so that the user may view them, and calculates an expected removal time and notifies the user of the time to thereby provide convenience to the user.

In a like manner of the first preferred embodiment of the present invention, the driver 500 uses an electrical heating system such as heat wires installed on the conventional vehicular windows, and cooling and heating devices such as heaters and air conditioners.

As operated above, the moisture is accurately sensed, and information on the generated moisture and time required for removing the moisture is provided to the user, thereby enhancing satisfaction caused by moisture removal.

An operational amplifier may be substituted for the moisture sensor 300, which will be described with reference to FIG. 5.

Figure 5:
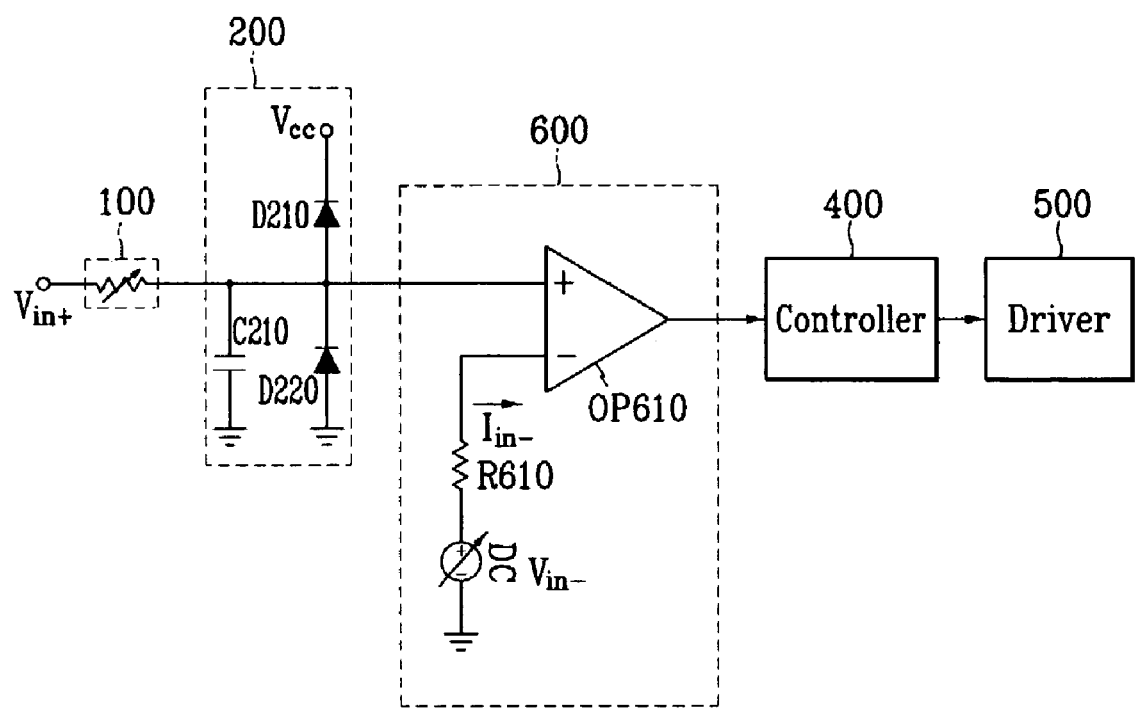
FIG. 5 shows a moisture remover according to a third preferred embodiment of the present invention.

FIG. 5 shows a moisture remover according to a third preferred embodiment of the present invention.

As shown, the moisture remover comprises a surface resistance detector 100, a static electricity preventer 200, a moisture sensor 600, a controller 400, and a driver 500.

The surface resistance detector 100, the static electricity preventer 200, the controller 400, and the driver 500 may be realized in various ways as described in the second preferred embodiment of the present invention, and no repeated description will be provided.

The moisture sensor 600 comprises a reference voltage source Vin-, a reference resistor R610, and an operational amplifier OP610.

An operation of the moisture remover according to the third preferred embodiment of the present invention will now be described.

The operational amplifier OP610 of the moisture sensor 600 receives the current from the surface resistance detector 100 through a non-inverting input terminal, compares it with the reference current Iin-input through an is inverting input terminal, and outputs a corresponding signal to the controller 400.

That is, when moisture is formed on the surface, and the current output by the surface resistance detector 100 is greater than the reference current Iin-, the operational amplifier OP610 outputs a logical high signal to the controller 400 so that the controller 400 may control to remove moisture.

When the moisture formed on the surface is removed, and the current output by the surface resistance detector 100 is less than the reference current Iin-, the operational amplifier OP610 outputs a logical low signal to the controller 400 so that the controller 400 may terminate controlling of moisture removal.

As described above, by using the operational amplifier OP610 to configure the moisture sensor 600, the moisture removal may be accurately controlled.

Figure 6:
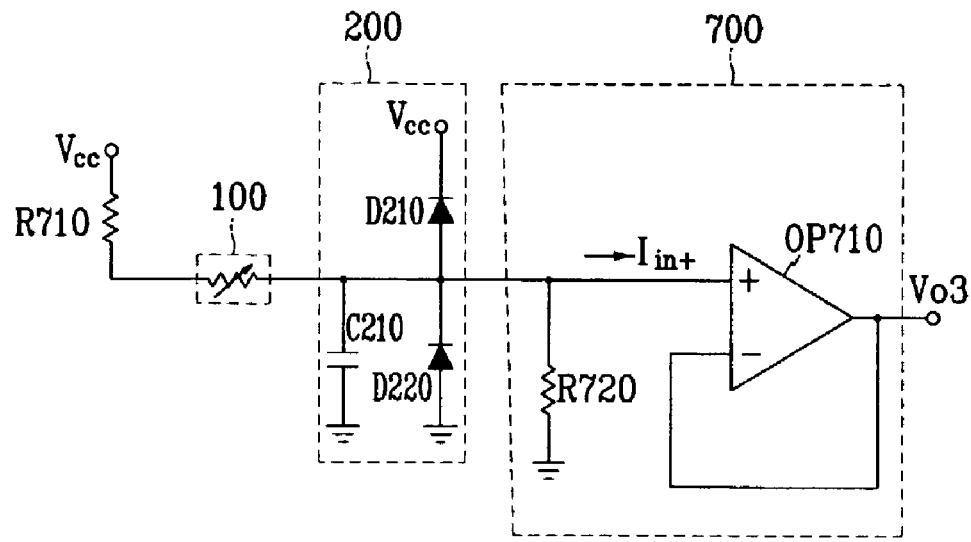
FIG. 6 shows a moisture remover according to a fourth preferred embodiment of the present invention.

FIG. 6 shows a circuit for detecting moisture that is more stable than the third preferred embodiment of the present invention.

Referring to FIG. 6, a moisture remover according to a fourth preferred embodiment of the present invention will be described.

The configuration of the fourth preferred embodiment is similar to that of the third preferred embodiment except that the moisture sensor of the fourth embodiment comprises resistors R710 and R720 and uses the operational amplifier OP710 as a voltage follower so as to obtain more accurate values output from the surface resistance detector 100.

Namely, more accurate values of the current input through the surface resistance detector 100 may be obtained by use of the resistors R710 and R720, and in particular, the resistor R720 functions as a pull down resistor.

The operational amplifier OP710 smoothes the signals input through a non-inverting terminal, and outputs them to directly drive the driver.

In the following, no descriptions of the components also included in the third embodiment will be provided.

Figure 7:
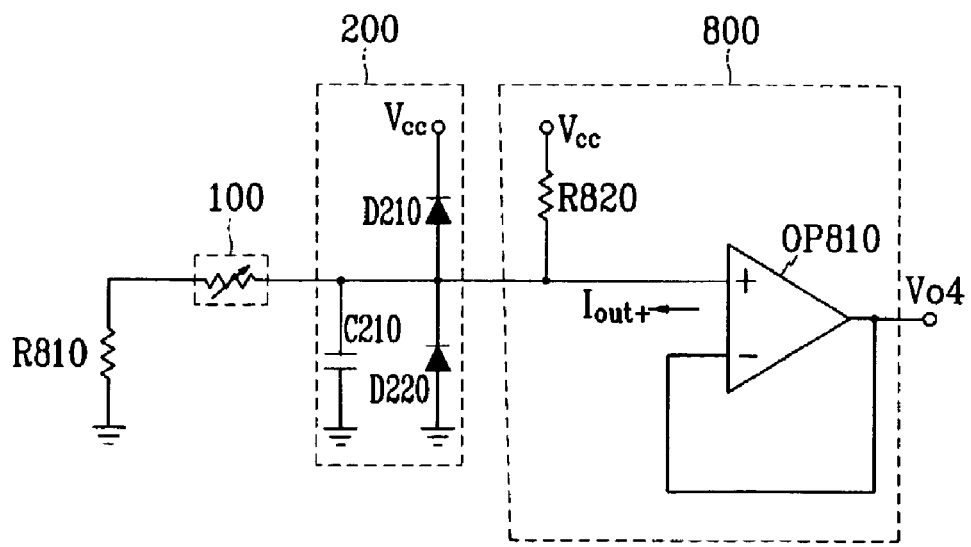
FIG. 7 shows a moisture remover according to a fifth preferred embodiment of the present invention;.

In the case of a different polarity of the bias voltage than in the fourth preferred embodiment, resistors R810 and R820 are provided as shown in FIG. 7, and hence, flexible processing may be possible according to polarities of the signals used by the operational amplifier OP810. FIG. 7 shows this fifth preferred embodiment of the present invention.

That is, in the fifth preferred embodiment of the present invention, differing from the fourth preferred embodiment, one terminal of the resistor R810 is coupled to an input terminal of the surface resistance detector 100 and another terminal of the resistor R810 is grounded, and one terminal of the resistor R820 is coupled to a non-inverting terminal of the operational amplifier OP810 and another terminal of the resistor R820 is coupled to the driving power Vcc, thereby functioning as a pull up resistor.

Since the current direction according to the fifth embodiment is opposite to that of the fourth embodiment, no descriptions will be provided so as to prevent repetition.

Resistors (not illustrated) may also be used to accurately obtain signals of the surface resistance detector in FIG. 1 or 4, which may be fully realized by persons skilled in the art.

In each embodiment, bipolar transistors are used for the moisture sensors 70 and 300 to realize a desired circuit, and in addition, MOS transistors or MOS-FET transistors may also be used instead of the bipolar transistors, which is obvious to persons skilled in the art.

Therefore, the present invention immediately determines moisture formation when moisture (or steam) is formed on the windows of a vehicle, and it automatically removes moisture and prevents the same, thereby providing clear and safe driving views.

Further, the present invention prevents accidents that may be caused by obstruction of the driver's vision because of moisture generated through steam formation, and frost, rain or snow.

In addition, since the present invention that operates in the above-described manner accurately removes moisture through a simple configuration, it saves production costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for removing moisture generated on a surface comprising:
   a surface resistance detector for detecting resistance of the surface, and outputting a corresponding signal;
   a static electricity preventer circuit for preventing generation of static electricity to signals sensed by the surface resistance detector;
   a moisture sensor comprising,
      a reference current generator for generating a reference current,
      a current detector for determining moisture generation states by detecting variations of a current that flows according to resistance of the surface resistance detector, comparing the detected current variations with the reference current, and outputting a moisture sensing signal based on the determined moisture generation state,
      a detection signal output unit for outputting corresponding logical value signals according to detected values output by the current detector,
      a signal smoother for converting the logical value signals output by the detection signal output unit into smoothed digital signals, and outputting the digital signals, and
      a current source supply for supplying a current source used for an operation of the current detector and the detection signal output unit, wherein the current source supply comprises a first through third current sources for supplying power used for an operation of the current detector, and a fourth current source for supplying a current used for operation of the detection signal output unit;
   a controller for receiving the moisture sensing signal from the moisture sensor, and controlling to removing moisture generated on the surface; and a driver being operable according to a control signal output by the controller, for removing the moisture generate on the surface.

2. The apparatus of claim 1, wherein the reference current generator comprises:
   a voltage source for generating predetermined voltage; and
   a resistor for allowing the current according to the resistance flow.

3. The apparatus of claim 1, wherein the current detector comprises:
   a first transistor having a base coupled to a detection terminal of the surface resistance detector, a collector being grounded, and an emitter receiving the first current source of the current source supply;
   a second transistor having a base coupled to the emitter of the first transistor, an emitter receiving the second current source of the current source supply, and a collector coupled to the detection signal output unit;
   a third transistor having an emitter receiving the third current source of the current source supply, a base receiving an output signal of the reference current generator, and a collector being grounded;
   a fourth transistor having a base coupled to the emitter of the third transistor, and an emitter receiving the second current source of the current source supply;
   a fifth transistor having a collector coupled to the collector of the second transistor, a base coupled to the collector of the fourth transistor, and an emitter being grounded; and
   a sixth transistor having a base and a collector coupled to the collector of the fourth transistor, and an emitter being grounded.

4. The apparatus of claim 1, wherein the detection signal output unit comprises:
   a first transistor having a base receiving an output signal of the current detector, a collector receiving the fourth current source of the current source supply, and an emitter being grounded; and
   a second transistor having a base coupled to the collector of the first transistor, and an emitter being grounded.

5. The apparatus of claim 1, wherein the signal smoother comprises:
   a resistor having one terminal coupled to driving power, and another terminal coupled to an output signal of the detection signal output unit; and
   a capacitor having one terminal coupled to another terminal of the resistor, and another terminal being grounded.

6. The apparatus of claim 1, wherein the controller comprises:
   an analog-digital converter for converting the current sensed by the moisture sensor into a digital signal, and outputting it;
   a microcomputer for receiving the moisture sensing signal output by the moisture sensor, determining moisture generation states, generating a corresponding moisture removal control signal, outputting the same to the driver, receiving the digital signal output by the analog-digital converter, and providing information on generation and amount of the moisture to a user; and
   a display for displaying the signals output by the microcomputer to the user.

7. The apparatus of claim 1, wherein the moisture sensor comprises:
   a voltage source for generating a predetermined voltage;
   a reference resistor for using the voltage of the voltage source, generating a reference current used for determining moisture sensing states, and outputting the reference current; and
   an operational amplifier for receiving variations of the current that flows according to the resistance of the surface resistance detector, comparing them with the reference current input through the reference resistor, determining moisture states, and outputting a corresponding signal.

8. The apparatus of claim 1, wherein the moisture sensor comprises:
   a first resistor for receiving driving power, and supplying power used for an operation of the surface resistance detector;
   a second resistor for converting the signal output by the surface resistance detector into a voltage signal, and outputting the voltage signal; and
   an operation amplifier for receiving a signal (input through the second resistor) of the surface resistance detector through a non-inverting terminal, smoothing the signal, and outputting the smoothed signal to the driver.

9. The apparatus of claim 1, wherein the static electricity preventer circuit comprises:
   a first diode having a cathode coupled to driving power, and an anode coupled to one terminal of the surface resistance detector; and
   a second diode having a cathode coupled to one terminal of the surface resistance detector, and an anode being grounded.

* * * * *